April 3, 1934.  E. W. DANIEL  1,953,290
CABLE CLAMP
Filed Oct. 31, 1932

INVENTOR
Edward W. Daniel
BY
Brockett, Hyde, Higley & Meyer
ATTORNEYS

Patented Apr. 3, 1934

1,953,290

UNITED STATES PATENT OFFICE 1,953,290

CABLE CLAMP

Edward W. Daniel, Cleveland, Ohio

Application October 31, 1932, Serial No. 640,371

2 Claims. (Cl. 24—126)

This invention relates to improvements in cable clamps such as are used to connect cables with anchors or with parts to be supported by said cables.

The general object of the present invention is the provision of an improved cable clamp which is of simple and inexpensive construction and which will securely grip and hold the end of the cable without introducing strains therein such as would tend to weaken the cable strands at any point.

A further object of the present invention is the provision of an improved cable clamp in which the end of a cable may be readily and firmly secured without the use of special tools and without the necessity of preliminarily preparing either the cable end to be secured or the cable clamp parts which effect the securement.

Further objects of the invention are in part obvious and in part will appear more in detail hereinafter.

Figure 1:
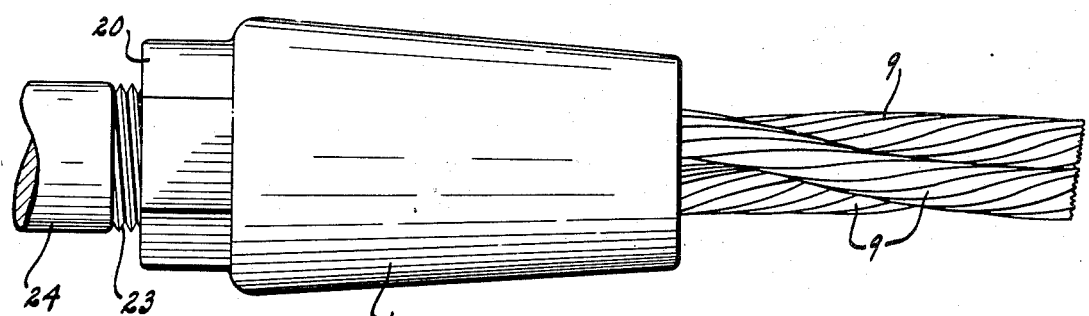
Figure 2:
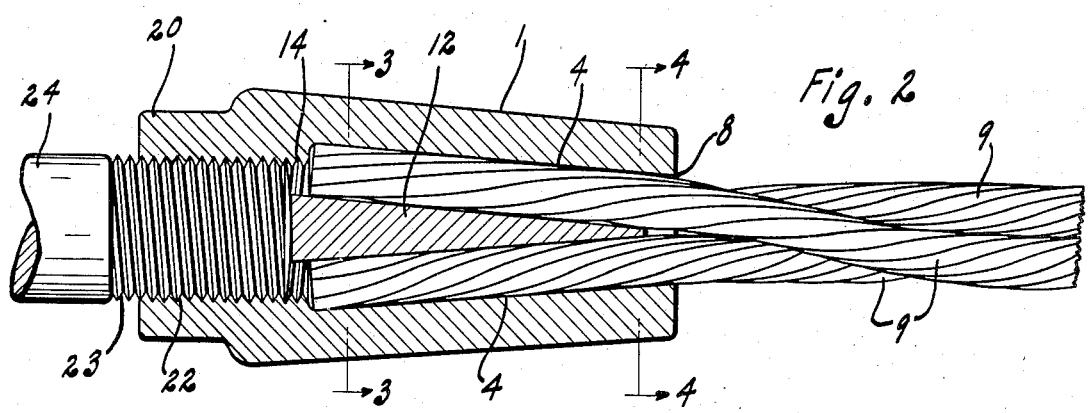
Figure 3:
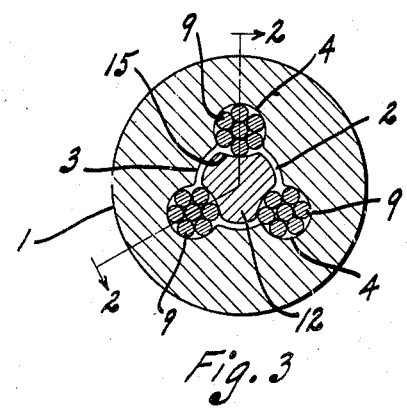
Figure 4:
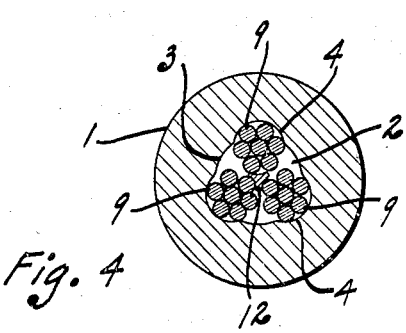
Figure 5:
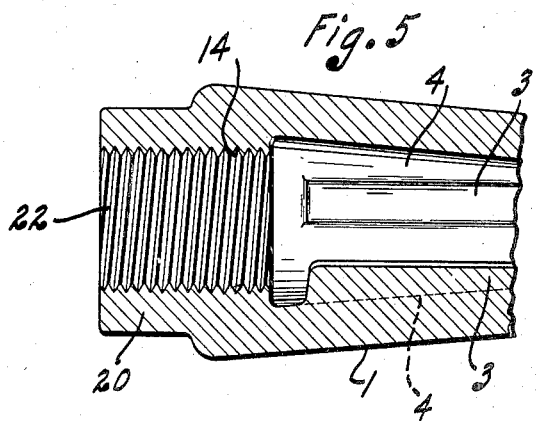
Figure 6:
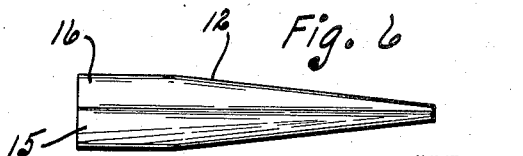

The invention will be readily understood from the following description of one embodiment thereof, reference being had to the accompanying drawing in which Fig. 1 is a side elevation of the present improved cable clamp, with a cable end secured therein and with said clamp connected to an anchoring member; Fig. 2 is a longitudinal vertical sectional view thereof, taken on the line 2—2, Fig. 3; Figs. 3 and 4 are cross sectional views thereof on the lines 3—3 and 4—4, Fig. 2, respectively; Fig. 5 is a longitudinal vertical sectional view of the larger end of the socket member of the present cable clamp; and Fig. 6 is a side elevation of the wedge member of the present cable clamp.

As clearly indicated in the accompanying drawing, the present improved cable clamp includes a suitable socket member 1, preferably formed as a simple metal casting and having any desired external shape or configuration, such as frusto-conical, as here shown. Within said socket member is a longitudinally disposed, generally frusto-conical shaped cable end-receiving socket 2, the side wall 3 of which is provided with a series of longitudinally disposed, relatively straight cable strand-receiving grooves 4, there being three such grooves in the present instance, inasmuch as the present cable clamp was designed for use as a securing means for a three-strand cable.

As clearly shown in Figs. 3 and 4, these cable strand-receiving grooves 4 are of decreasing depth from the larger end of the socket 2 to the smaller end thereof, with the result that at the socket member end opening 8, located at the smaller end of the socket 2, the three strands 9 of the cable end secured in the present cable clamp are almost in their fully twisted, fully contacting condition, as best shown in Fig. 2.

To secure an end portion of a three strand cable in the socket member 1 of the present improved cable clamp, said cable end portion is inserted into the socket 2 of said socket member through the end opening 8 thereof. The exposed portion of said cable is then turned, while the socket member is held stationary, in a direction to effect untwisting of the end portions of its strands 9, with the result that said strand end portions are caused to become spread or separated and to lie in the strand-receiving grooves 4 of the socket member wall 3.

After such spreading of the strand end portions, a generally frusto-conical shaped metal wedge member 12 is inserted, smaller end first, into the socket 2 of the socket member 1, the insertion of said wedge member being effected through a socket member end opening 14 located at the larger end of the socket 2 thereof. Said wedge member is positioned within the socket 2 in the space at the center of the three strand end portions, as shown in Figs. 2, 3 and 4, and said wedge member is driven into the socket 2 within the spread strand end portions, just as far as it will go, with the result that said strand end portions are firmly secured or tightly wedged in the socket 2 of the socket member 1, between said wedge member and the socket wall 3, all as will be readily understood.

Preferably and as shown, the wedge member 12 is provided with a plurality of longitudinally disposed, relatively straight strand-receiving grooves 15, the number of which corresponds, of course, to the number of strand-receiving grooves 4 of the socket member wall 3, or in other words, to the number of strands of the cable which the present cable clamp is adapted to receive and secure. Like the strand-receiving grooves 4 of the socket member, the strand-receiving grooves 15 of the wedge member are of diminishing depth from the larger end thereof to the smaller end thereof, as best shown in Figs. 3 and 4. In order to effect a tighter binding of the cable strand end portions within the socket member 1, the rear and larger end portion 16 of the wedge member 12 is preferably made of generally cylindrical shape, rather than of generally frusto-conical shape as is the middle and front end portions of said wedge member, all as best known in Fig. 6.

In order to enable the socket member 1 to be easily and firmly secured to the desired anchor part, or to the part which is to be supported by the cable, said socket member is here shown as provided with an anchoring extension 20 located at the larger end thereof, said extension having a non-circular external shape or configuration, such as octagonal, and also having a longitudinally disposed passageway 22 in alignment with and forming a continuation of the end opening 14 of the socket member 1. In the embodiment of the invention here shown, the extension passageway 22 and the socket member end opening 14 are suitably threaded to receive the threaded end portion 23 of a suitable anchoring member 24.

If desired, this anchoring member may be used to drive the wedge member 12 forwardly into the socket 2 of the socket member 1, or at least, by engaging the rear end of said wedge member, to prevent subsequent rearward movement thereof, all as will be readily understood.

Further features of the present invention will be apparent to those skilled in the art to which it relates.

What I claim is:

1. A cable clamp, comprising a socket member having a longitudinally disposed and generally frusto-conical shaped socket open at both ends, the side wall of said socket being provided with a series of longitudinally disposed, relatively straight cable strand-receiving grooves, said socket being adapted to receive one end portion of a cable with the strands thereof spread and lying in said grooves, and a generally frusto-conical shaped wedge member adapted to be positioned in said socket within the spread strands of said cable end portion, said wedge member being provided with a series of longitudinally disposed, relatively straight grooves for the reception of said cable strands, the grooves of said socket wall and said wedge member being of decreasing depth from the larger ends of said parts to the smaller ends thereof.

2. A cable clamp, comprising a socket member having a longitudinally disposed and generally frusto-conical shaped socket open at both ends, the side wall of said socket being provided with a series of longitudinally disposed, relatively straight cable strand-receiving grooves, said socket being adapted to receive one end portion of a cable with the strands thereof spread and lying in said grooves, and a generally frusto-conical shaped wedge member adapted to be positioned in said socket within the spread strands of said cable end portion, said wedge member being provided with a series of longitudinally disposed, relatively straight grooves for the reception of said cable strands, the rear and larger end portion of said wedge member being of generally cylindrical shape.

EDWARD W. DANIEL.